United States Patent
Vichailak et al.

(10) Patent No.: US 9,315,741 B2
(45) Date of Patent: Apr. 19, 2016

(54) PROCESS FOR ULTRA LOW BENZENE REFORMATE USING CATALYTIC DISTILLATION

(75) Inventors: Montri Vichailak, Houston, TX (US); Purvis K. Ho, Houston, TX (US); Martinus J. Almering, Pasadena, TX (US); Arvids Judzis, Jr., Pasadena, TX (US); Willibrord A. Groten, Pasadena, TX (US); Lawrence A. Smith, Jr., Pasadena, TX (US); Yongqiang Xu, Pasadena, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 1985 days.

(21) Appl. No.: 12/206,039

(22) Filed: Sep. 8, 2008

(65) Prior Publication Data
US 2010/0063334 A1    Mar. 11, 2010

(51) Int. Cl.
*C07C 7/163* (2006.01)
*C10G 45/44* (2006.01)
*C10G 35/04* (2006.01)
*C10G 65/04* (2006.01)

(52) U.S. Cl.
CPC .............. *C10G 45/44* (2013.01); *C10G 35/04* (2013.01); *C10G 65/04* (2013.01); *Y02P 20/132* (2015.11)

(58) Field of Classification Search
USPC ......... 585/266, 268, 267, 250, 259, 253, 254, 585/269, 277, 323, 446, 447, 467, 800
See application file for complete search history.

(56) References Cited

U.S. PATENT DOCUMENTS

| | | | |
|---|---|---|---|
| 4,302,356 A | 11/1981 | Smith, Jr. | |
| 4,443,559 A | 4/1984 | Smith, Jr. | |
| 4,731,229 A | 3/1988 | Sperandio et al. | |
| 5,073,236 A | 12/1991 | Gelbein et al. | |
| 5,082,983 A | 1/1992 | Breckenridge et al. | |
| 5,198,102 A | 3/1993 | Kaul et al. | |
| 5,210,348 A | 5/1993 | Hsieh et al. | |
| 5,266,546 A | 11/1993 | Hearn | |
| 5,431,890 A | 7/1995 | Crossland et al. | |
| 5,663,466 A * | 9/1997 | Rice et al. | 585/253 |
| 5,730,843 A | 3/1998 | Groten et al. | |
| 5,773,670 A * | 6/1998 | Gildert et al. | 585/266 |
| 5,856,602 A | 1/1999 | Gildert et al. | |
| 6,048,450 A * | 4/2000 | Mikitenko et al. | 208/143 |
| 6,187,980 B1 * | 2/2001 | Gildert | 585/266 |
| 6,855,853 B2 | 2/2005 | Groten et al. | |
| 7,090,766 B2 * | 8/2006 | Johnson et al. | 208/210 |
| 7,175,754 B2 * | 2/2007 | Groten et al. | 208/211 |

(Continued)

OTHER PUBLICATIONS

International Search Report and Written Opinion issued Apr. 14, 2010 in related International Application PCT/US2009/055637 (12 pages).

(Continued)

*Primary Examiner* — In Suk Bullock
*Assistant Examiner* — Sharon Pregler
(74) *Attorney, Agent, or Firm* — Osha Liang LLP

(57) ABSTRACT

A process for reducing the concentration of benzene in a hydrocarbon stream, the process including: fractionating a reformate to form a benzene concentrate fraction comprising benzene and other $C_6$ hydrocarbons, and a heavies fraction comprising $C_{7+}$ hydrocarbons; and hydrogenating the benzene concentrate fraction to form a hydrocarbon fraction having a reduced benzene concentration.

19 Claims, 5 Drawing Sheets

(56) References Cited

U.S. PATENT DOCUMENTS

| | | |
|---|---|---|
| 7,320,745 B2 * | 1/2008 | Judzis et al. .................... 203/21 |
| 7,501,549 B2 | 3/2009 | Podrebarac et al. |
| 2005/0082201 A1 | 4/2005 | Groten et al. |
| 2007/0299294 A1 * | 12/2007 | Lin et al. ....................... 585/857 |

OTHER PUBLICATIONS

Office Action (with translation) dated Jun. 14, 2012 issued in corresponding Eurasian patent application No. 201170429 (4 pages).

* cited by examiner

PROCESS FOR ULTRA LOW BENZENE REFORMATE USING CATALYTIC DISTILLATION

BACKGROUND OF DISCLOSURE

1. Field of the Disclosure

Embodiments disclosed herein relate generally to a process for the reduction or removal of benzene in a hydrocarbon stream, such as a gasoline fraction. More specifically, embodiments disclosed herein relate to the removal of benzene from a reformate stream.

2. Background

One common process long used by the refinery industry to upgrade raw naphtha to high octane gasoline is catalytic reforming. In catalytic reforming the raw naphtha having a boiling range from about 46 to 177° C. (115° F.-350° F.) is passed over an alumina supported noble metal catalyst at elevated temperatures (about 493° C.-565° C. (920° F.-1050° F.)) and moderate pressure (about 2 bar to 39 bar (about 15-550 psig)). The catalyst "reforms" the molecular structures of the hydrocarbons contained in the raw naphtha by removing hydrogen and rearranging the structure of the molecules so as to improve the octane number of the naphtha. However, the increase in octane number also reduces the liquid volume of the naphtha as the specific gravity is increased.

Because of the multiplicity of the compounds in the raw naphtha, the actual reactions which occur in catalytic reforming are numerous. However, some of the many resulting products are aryl or aromatic compounds, all of which exhibit high octane numbers. The aryl compounds produced depend upon the starting materials which in a refinery are controlled by the boiling range of the naphtha used and the crude oil source.

The "reformed" product from a catalytic reforming process is commonly called reformate and is often separated into two fractions by conventional distillations—a light reformate having a boiling range of about 46° C.-121° C. (about 115° F.-250° F.) and a heavy reformate having a boiling range of about 121° C.-177° C. (about 250° F.-350° F.). The aryl compounds in each fraction are thus dependent upon their boiling points. The lower boiling or lighter aryl compounds, e.g., benzene, toluene and xylenes, are contained in the light reformate and higher boiling aryl compounds are contained in the heavy reformate. In other circumstances, the light reformate may contain only the benzene, or only benzene and toluene, depending upon any downstream processing of the stream.

The demand for cleaner and safer transportation fuels is becoming greater every year. Two major sources of gasoline feedstock, including reforming and catalytic cracking, present both a problem meeting strict environmental regulations and impose certain health risks. For example, light reformate typically contains unacceptably high levels of benzene, a known carcinogen.

Refiners in the U.S. and in other countries are required to remove benzene from reformate streams and other gasoline fractions. Various options for the removal of benzene from such streams may include distillation, extraction, hydrogenation, alkylation, and transalkylation. However, due to a limited quantity of benzene contained in non-reformate streams, it may be uneconomical for a non-integrated refiner to recover benzene from various gasoline fractions, such as naphtha produced in a fluid catalytic cracking (FCC) unit, for example.

Extraction of benzene requires expensive capital investment in necessary equipment and a customer for the benzene product, neither of which may be feasible for a small, non-integrated refiner. Also, while it is possible to extract benzene from the gasoline pool by fractionation techniques, such techniques are not preferred, because the boiling point of benzene is too close to that of some of the more desirable organic components, including $C_6$ paraffins and isoparaffins. Monoalkylate aromatics (monoalkylate), such as toluene, xylenes, and ethylbenzene are more desirable for gasoline blending, as opposed to benzene, because they are less objectionable both from an environmental and a safety point of view. Additionally, toluene, xylenes, and ethylbenzene each have a higher octane rating than benzene.

Alternatively, benzene in reformate may be removed via hydrogenation. However, non-selective hydrogenation of aromatics, such as benzene and toluene in a reformate stream, results in reduced octane rating and thus diminishes the overall value of the fuel.

Generally refiners tend to prevent benzene from entering the gasoline blending stock. For example as mentioned above the light reformate may be subjected to aromatic removal by solvent extraction. This, however, removes all aromatic material not just the benzene. One method of preventing the introduction of benzene into the gasoline pool is to remove the benzene precursors (methyl cyclopentane and isohexane) from the charge to the catalytic reforming units. This does not solve the problem of streams which contain benzene as well as heavier aromatic compounds such as toluene and xylenes. The heavier aromatics contribute greatly to the octane pool and to date have not been found to be detrimental to the environment.

U.S. Pat. No. 5,773,670 discloses a process for the hydrogenation of aromatics in a petroleum stream. However, like solvent extraction, the process is not selective to only the benzene. U.S. Pat. No. 5,856,602 discloses the hydrogenation of aromatics in a hydrocarbon stream utilizing a distillation column reactor wherein the placement of the catalyst bed and operation of the distillation column controls which aromatic is retained in the catalyst bed for hydrogenation. U.S. Pat. No. 6,187,980 discloses a process for the hydrogenation of benzene to cyclohexane in a distillation column reactor wherein essentially pure benzene is used as the feed to the reactor.

Benzene hydrogenation in U.S. Pat. No. 5,856,602 may be conducted at disclosed pressures of less than about 120 psig, and temperatures of about 65° C. to 204° C. (150° F. to 400° F.). Such a process may allow the separation of a benzene concentrated stream from reformate and selectively hydrogenating the benzene in a single unit. In such a unit, the activity of the catalyst can be increased by increasing the column operating pressure to gain temperature and partial pressure of hydrogen. Such an increase in catalyst activity may be desired to meet increasingly stringent requirements on gasoline benzene concentration, for example.

Unfortunately, operation of a column at the higher pressures requires higher reflux as the relative volatility between benzene and toluene becomes smaller. Too high a pressure will also cause high temperatures in the column bottoms, and may require a fire heater. Another disadvantage is that the hydrogen fed to the column will be diluted by the vapor rate required for the higher reflux rate. These disadvantages may cause an increase in the catalyst requirements, and the catalyst requirements may be significant, especially where the requirement of benzene is less than 0.1 or 0.2 weight percent.

Accordingly, there is still a significant need in the art for economical methods to reduce the levels of benzene in refinery streams, such as to below 0.1 or 0.2 weight percent, without using an excessive amount of catalyst.

SUMMARY OF THE DISCLOSURE

In one aspect, embodiments disclosed herein relate to a process for reducing the concentration of benzene in a hydrocarbon stream, the process including: fractionating a reformate to form a benzene concentrate fraction comprising benzene and other $C_6$ hydrocarbons, and a heavies fraction comprising $C_{7+}$ hydrocarbons; and hydrogenating the benzene concentrate fraction to form a hydrocarbon fraction having a reduced benzene concentration.

In another aspect, embodiments disclosed herein relate to a process for reducing the concentration of benzene in a hydrocarbon stream, the process including: feeding a reformate comprising benzene, components lighter than benzene, and components heavier than benzene to a first distillation column; fractionating the reformate to form a fraction comprising benzene and other $C_6$ hydrocarbons, and a heavies fraction comprising $C_{7+}$ hydrocarbons; recovering the heavies fraction from the first distillation column as a first bottoms fraction; withdrawing the fraction comprising benzene from the distillation column; feeding the fraction comprising benzene and hydrogen to a hydrogenation reactor comprising at least one reaction zone comprising a hydrogenation catalyst; contacting the benzene and hydrogen in the presence of the hydrogenation catalyst to convert at least a portion of the benzene to cyclohexane; and recovering a fraction having a reduced benzene concentration.

In another aspect, embodiments disclosed herein related to a process for reducing the concentration of benzene in a hydrocarbon stream, the process including: feeding hydrogen and a reformate comprising benzene, components lighter than benzene, and components heavier than benzene to a first catalytic distillation reactor system comprising at least one reaction zone comprising a hydrogenation catalyst; concurrently in the first catalytic distillation reactor system: contacting the benzene and hydrogen in the presence of the hydrogenation catalyst to convert at least a portion of the benzene to cyclohexane; and fractionating the reformate to form a fraction comprising unreacted benzene and other $C_6$ hydrocarbons, and a heavies fraction comprising $C_{7+}$ hydrocarbons; recovering the heavies fraction from the first catalytic distillation reactor system as a first bottoms fraction; withdrawing the fraction comprising benzene and other $C_6$ hydrocarbons from the catalytic distillation reactor system; feeding hydrogen and the fraction comprising benzene and other $C_6$ hydrocarbons to a hydrogenation reactor comprising at least one reaction zone comprising a hydrogenation catalyst; contacting the benzene and hydrogen in the presence of the hydrogenation catalyst to convert at least a portion of the benzene to cyclohexane; and recovering a hydrocarbon fraction having a reduced benzene concentration, Other aspects and advantages will be apparent from the following description and the appended claims.

DETAILED DESCRIPTION

Figure 1:
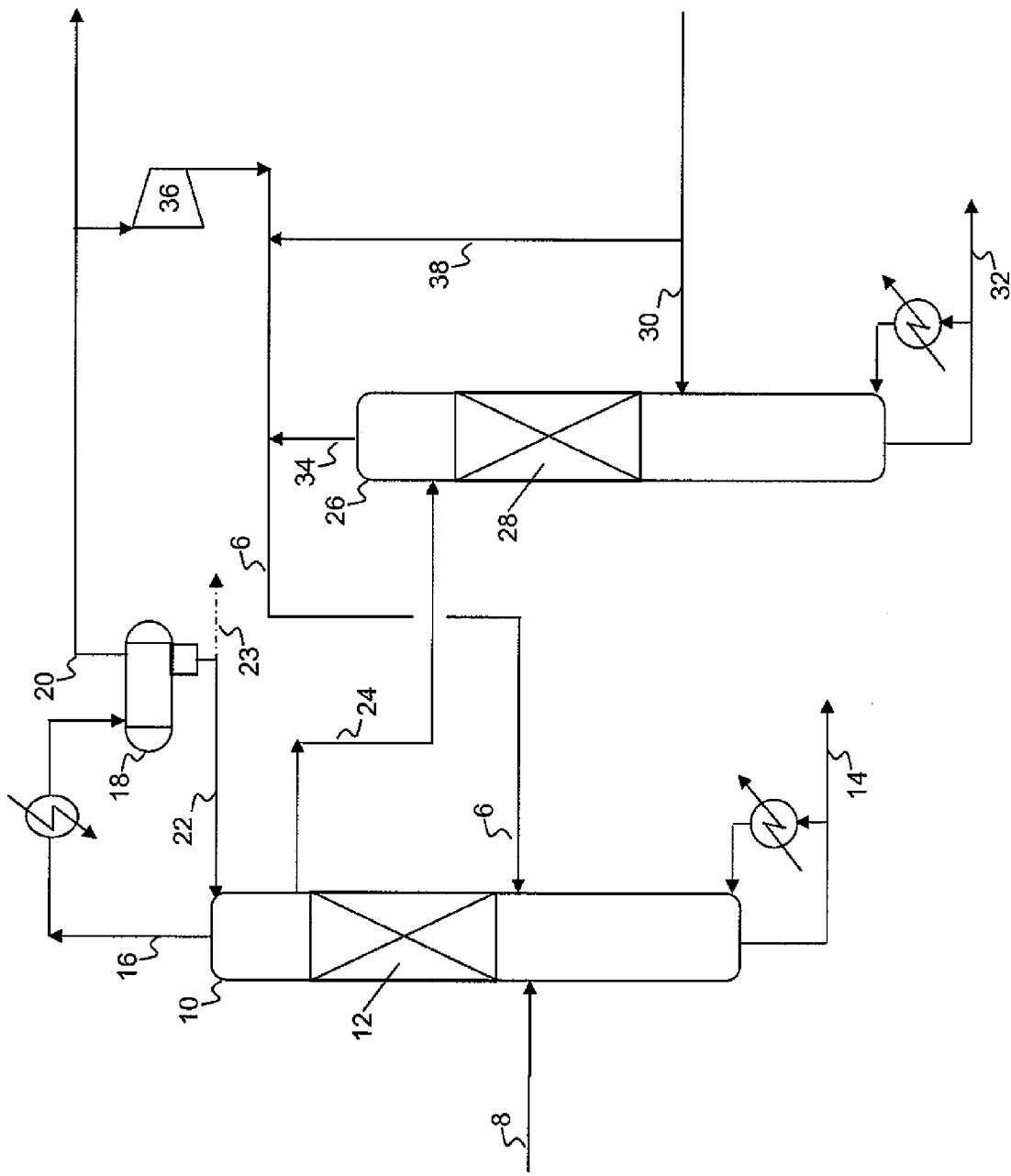
FIG. 1 is a simplified flow diagram of a process for the reduction or removal of benzene from hydrocarbon streams according to embodiments disclosed herein.

In one aspect, embodiments herein relate to processes for the reduction or removal of benzene in a hydrocarbon stream. More specifically, embodiments disclosed herein relate to processes for the reduction or removal of benzene from a reformate stream via separation and treatment of a select portion of the reformate stream. Processes disclosed herein advantageously separate and treat select portions of the hydrocarbon feed, namely a fraction including benzene. Such benzene-containing fractions may include a $C_6$ cut, a $C_5$-$C_6$ cut, and others. The benzene-containing fraction may then be treated to reduce or remove the benzene contained therein. The desired separation and treatment may be achieved via various combinations of distillation, catalytic distillation, and fixed bed reactors.

Within the scope of this application, the expression "catalytic distillation reactor system" denotes an apparatus in which the catalytic reaction and the separation of the products take place at least partially simultaneously. The apparatus may comprise a conventional catalytic distillation column reactor, where the reaction and distillation are concurrently taking place at boiling point conditions, or a distillation column combined with at least one side reactor, where the side reactor may be operated as a liquid phase reactor or a boiling point reactor. While both catalytic distillation reactor systems described may be preferred over conventional liquid phase reaction followed by separations, a catalytic distillation column reactor may have the advantages of decreased piece count, reduced capital cost, increased catalyst productivity per pound of catalyst, efficient heat removal (heat of reaction may be absorbed into the heat of vaporization of the mixture), and a potential for shifting equilibrium. Divided wall distillation columns, where at least one section of the divided wall column contains a catalytic distillation structure, may also be used, and are considered "catalytic distillation reactor systems" herein.

It may be desirable to reduce or remove benzene in any number of refinery streams. Any complex refinery streams containing a minor amount of benzene and which need to be and can be reduced in benzene content by hydrogenation, is appropriate for use in the present process. By "complex refinery streams," it is intended to mean the normally liquid product streams found in a refinery from cokers, FCC units, reformers, hydrocrackers, hydrotreaters, delayed cokers, distillation columns, etc. which streams comprise a range of chemical constituents, mainly hydrocarbonaceous, and having a broad boiling point range. The hydrocarbon feed to the processes disclosed herein may be a benzene-containing fraction which boils in the gasoline boiling range, including reformate, FCC gasoline, coker pentane/hexane, coker naphtha, FCC naphtha, straight run gasoline, pyrolysis gasoline, and mixtures containing two or more of these streams. In some embodiments, reformate streams may be undistilled, such as a reformate stream fed directly from a reformer to processes described herein. Such gasoline fractions typically have a normal boiling point within the range of 0° C. and 260° C., as determined by an ASTM D86 distillation. Feeds of this type include light naphthas typically having a boiling range of about $C_6$ to 165° C. (330° F.); full range naphthas, typically having a boiling range of about $C_5$ to 215° C. (420° F.), heavier naphtha fractions boiling in the range of about 125° C. to 210° C. (260° F. to 412° F.), or heavy gasoline fractions boiling in the range of about 165° C. to 260° C. (330° F. to 500° F.). In general, a gasoline fuel will distill over the range of from about room temperature to 260° C. (500° F.). In some embodiments, these streams may be treated to remove sulfur, nitrogen, and other undesired components. For convenience, each of these various complex refinery streams will be referred to herein as reformate.

Reformate fractions for use in embodiments of the hydrogenation processes described herein may include $C_3$ to $C_9$ and higher hydrocarbons. For example, refinery streams may be separated by fractional distillation, recovering a certain fraction for further processing. A light naphtha cut is one such refinery stream, and because such a cut often contains compounds that are very close in boiling points, the separations are not precise. The light naphtha refinery cut is valuable as a source of isoolefins ($iC_5$= and $iC_6$= compounds, for example) for forming an ether by reaction with ethanol. Thus, a $C_5$ stream, for instance, may include $C_4$s and up to $C_8$s and higher. These components may be saturated (alkanes), unsaturated (mono-olefins, including isoolefins), and poly-unsaturated (diolefins, for example). Additionally, the components may be any or all of the various isomers of the individual compounds. Such a mixture may easily contain 150 to 200 components. Other hydrocarbon streams of $C_4$ to $C_9$ carbon atoms may be used in embodiments disclosed herein.

In some embodiments, gasoline fractions may include a $C_4$ cut, which may include $C_3$ to $C_5$ or higher hydrocarbons (i.e., $C_{6+}$). In other embodiments, gasoline fractions may include a $C_5$ cut, which may include $C_4$ to $C_8$ or higher hydrocarbons, including olefins, In other embodiments, gasoline fractions may include a $C_6$ cut, which may include $C_4$ to $C_9$ or higher hydrocarbons, including olefins, In other various embodiments, gasoline fractions may include mixtures of one or more of $C_4$, $C_5$, $C_6$, and $C_{7+}$ hydrocarbons, where the mixture includes olefinic compounds. The above described streams may include $C_4$ to $C_7$ streams, FCC gasoline, pyrolysis gasoline, coker gasoline, and other refinery streams having similar properties.

Saturated compounds included in the above described gasoline fractions may include various isomers of butane, various isomers of pentane, and various isomers of hexane, among others, for example. Olefinic compounds included in the above described gasoline fractions may include isobutylene and other butene isomers, various isomers of pentene, various isomers of hexene, and various isomers of heptene, among others, for example. Aromatic compounds that may be included in the above described gasoline fractions may include benzene, toluene, xylenes, ethylbenzene, cumenes, and other various derivatives of benzene, such as polyalkylated benzene (ethyl methyl benzene, diethyl benzene, etc.).

In accordance with some embodiments, a light reformate may include a complex aromatics-containing stream containing a minor amount of benzene, produced in a refinery reforming unit, and generally having a boiling point range of 15° C. to 104° C. (60° F. to 220° F.). In such instances the benzene concentration of the light aromatics-containing streams may range from about 1% to 40% by volume in some embodiments; between about 2% and 30% in other embodiments; and between about 5% and 25% in yet other embodiments.

In some embodiments, a full boiling range reformate may be used as the process feed. In such instances the reformate will generally have a boiling point range of 15° C. to 204° C. (60 to 400° F.), and the benzene concentration of the full boiling range aromatics-containing stream may range from about 1% to 20% by volume in some embodiments; between about 2% and 15% in other embodiments; and between about 3% and 10% in yet other embodiments. The concentration of olefins in reformate streams may vary, and may range from 0% to 20% olefin by volume; between 0% and 10% in other embodiments; and between 0% and 5% by volume in other embodiments.

While removal of benzene is a primary goal of the processes disclosed herein, it may also be desirable to limit saturation of other olefins contained within the hydrocarbon feed, as well as other aromatics contained within the feed. In other embodiments, hydrocarbon streams containing benzene may also contain compounds that may negatively affect catalyst performance, such as dienes, acetylenes, and other bad actors that may poison catalysts used herein or result in excessive polymer formation on the catalyst surface. Embodiments disclosed herein may provide for one or more of reduced olefin saturation, reduced saturation of toluene and higher molecular weight aromatics, extended catalysts service life and decreased costs associated with treatment of the feed streams to remove catalyst poisons and other bad actors.

Any catalyst useful for the hydrogenation of benzene may be used in the processes disclosed herein. Among the metals known to catalyze the hydrogenation reaction are platinum, rhenium, cobalt, molybdenum, nickel, tungsten and palladium. For example, the hydrogenation catalyst may include substantially any catalyst capable of catalyzing the hydrogenation of benzene to cyclohexane. Such a catalyst may include a Group VIII metal, which may be supported on a porous inorganic oxide support, for example. Group VIII metals of the Periodic Table of Elements, such as platinum and palladium may be used as the principal catalytic component, alone or with promoters and modifiers such as palladium/gold, palladium/silver, and cobalt/zirconium. Such catalysts may be deposited on a support, such as alumina, fire brick, pumice, carbon, resin, silica, an aluminosilicate, such as a zeolite or the like. Generally, commercial forms of catalyst use supported oxides of these metals. The oxide is reduced to the active form either prior to use with a reducing agent or reduced during use by the hydrogen in the feed. Specific examples of hydrogenation catalysts useful in embodiments herein include platinum on alumina and platinum on a zeolite with alumina binder added for strength. Suitable zeolites include X, Y, faujasite, mordenite, and synthetic aluminosilicates, among others.

When used in a catalytic distillation reactor system, to facilitate fractionation and catalytic activity, the above described catalysts may be prepared in the form of a distillation structure. The catalytic distillation structure must be able to function as catalyst and as mass transfer medium. The catalyst must be suitably supported and spaced within the column to act as a catalytic distillation structure.

In some embodiments, the catalyst is contained in a structure as disclosed in U.S. Pat. No. 5,730,843, which is hereby incorporated by reference. In other embodiments, one or more of the above-described catalysts may be contained in a plurality of wire mesh tubes closed at either end and laid across a sheet of wire mesh fabric such as demister wire. The sheet and tubes are then rolled into a bale for loading into the distillation column reactor. This embodiment is described, for example, in U.S. Pat. No. 5,431,890, which is hereby incorporated by reference. Other usefull catalytic distillation structures are disclosed in U.S. Pat. Nos. 4,302,356, 4,443,559, 4,731,229, 5,073,236, 5,431,890, 5,266,546, and 5,730,843, which are each incorporated by reference.

Processes disclosed herein advantageously separate and treat select portions of the hydrocarbon feed, namely a fraction including benzene. Such benzene-containing fractions may include a $C_6$ cut, a $C_5$-$C_6$ cut, and a $C_4$-$C_6$ cut, among others. The benzene-containing fraction may then be treated to reduce or remove the benzene contained therein. The desired separation and treatment may be achieved via various combinations of distillation, catalytic distillation, and fixed bed reactors.

Processes disclosed herein may include any number of reactors, including catalytic distillation reactor systems, both up-flow and down-flow. Use of catalytic distillation reactor systems may prevent foulants and heavy catalyst poisons in the feed from contacting the catalyst. In addition, clean hydrogenated reflux may continuously wash the catalyst zone. These factors combine to provide a long catalyst life. The heat of reaction evaporates liquid and the resulting vapor is condensed in the overhead condenser to provide additional reflux. The natural temperature profile in the fractionation column results in a virtually isothermal catalyst bed rather than the temperature increase typical of conventional fixed bed reactors.

Other reactors useful in embodiments disclosed herein may include traditional fixed bed reactors, boiling point reactors, and pulsed flow reactors, where the hydrogen flow and hydrocarbon flow may be co-current or counter-current. Boiling point and pulsed flow reactors may also provide for a continuous washing of the catalyst in addition to capturing at least a portion of the heat of reaction through evaporation, allowing for an improved reactor temperature profile as compared to conventional fixed bed reactors.

Various process schemes related to the selective separation and treatment of hydrocarbon streams containing benzene are described in relation to FIGS. 1-4 below.

Referring now to FIG. 1, a simplified process flow diagram for the reduction or removal of benzene from a hydrocarbon stream, according to embodiments disclosed herein, is illustrated. Selective hydrogenation of benzene according to embodiments disclosed herein may be attained by feeding hydrogen 6 and a benzene-containing reformate 8 to a catalytic distillation reactor system 10 including at least one reaction zone 12 containing a hydrogenation catalyst, where the at least one reaction zone 12 is located in an upper portion of the catalytic distillation reactor system. Benzene-containing reformate 8 may include components lighter than benzene, benzene, and components heavier than benzene. Hydrogen 6 and benzene-containing reformate 8 may be fed to the catalytic distillation reactor system 10 at a location below reaction zone 12, such that $C_6$ and lighter components, including benzene, may distill upward into the reaction zone. The $C_7$ and heavier components, including toluene, may be distilled downward, avoiding or minimizing contact of $C_{7+}$ aromatic compounds with the hydrogenation catalyst in reaction zone 12. At least a portion of the benzene and hydrogen may then react to form cyclohexane.

The operation of the catalytic distillation column should be such that reaction conditions suitable for the hydrogenation of benzene are achieved in the reaction zones. The distillation column reactor is operated at a pressure such that a reaction mixture is boiling in the bed of catalyst. Catalytic distillation reactor system 10 may operate at an overhead pressure in the range between 1 bar and 25 bar (about 0 to 350 psig), such as 18.3 bar or less (250 psig or less) in some embodiments, and 3.4 to 9.3 bar (35 to 120 psig) or 6.5 to 9.3 bar (80 to 120 psig) in other embodiments. Temperatures in distillation column reactor system 10 may be in the range from 38° C. to 260° C. (100 to 500° F.) in some embodiments; from 65° C. to 204° C. (150° F. to 400° F.) in other embodiments; from 93° C. to 191° C. (200° F. to 375° F.) in other embodiments; and from 127° C. to 138° C. (260° F. to 280° F.) in yet other embodiments, each at the requisite hydrogen partial pressures, such as between about 0.01 bar to about 4.8 bar (0.1 and 70 psi) in some embodiments, from about 0.1 bar to about 3.5 bar (1 to 50 psi) in yet other embodiments, and from about 0.2 bar to about 2.1 bar (3 to about 30 psi) in yet other embodiments. Under these conditions the benzene is maintained in the hydrogenation catalyst zone a sufficient time to obtain benzene conversions of over 50 weight percent, usually over 80 weight percent, but may be as low as 10 weight percent. The feed weight hourly space velocity (WHSV), which is herein understood to mean the unit weight of feed per hour entering the reaction distillation column per unit weight of catalyst in the catalytic distillation structures, may vary over a very wide range within the other condition perimeters, e.g., from about 0.1 to about 35. The overhead pressure of the column will vary depending upon the reaction temperature, and should be maintained so as to attain the desired $C_6/C_7$ split for the selective hydrogenation of benzene.

Catalytic distillation reactor system 10 may include conventional trays or packing both above and below reaction zone 12, providing for separation of the feed components. The $C_7$ and heavier components may be recovered from distillation column reactor system 10 as a first bottoms fraction 14.

In some embodiments, a light fraction, such as a $C_3$, a $C_4$, a $C_4$-$C_5$, or a $C_4$-$C_6$ cut may be recovered from distillation column reactor system 10 as a first overheads fraction 16, along with any unreacted hydrogen. Overheads fraction 16 may then be cooled and at least partially condensed, where the resulting liquid and vapor phases may be separated in drum 18. Hydrogen and non-condensed lights, such as methane, ethane, and other light hydrogenation by-products, may be recovered via flow line 20. Condensed liquids may be returned to the column as a total reflux via flow line 22.

In other embodiments, a portion of the condensed liquids may be recovered as an overheads fraction via flow line 23. For example, $C_4$ or $C_5$ and lighter hydrocarbons, separated from the hydrogen in drum 18, may be recovered and further processed separate from the $C_6$ fraction, where column 10 is operated under partial reflux. Recovery of a $C_5$ or a $C_4$ and lighter fraction as an overhead fraction may be desired, for example, to minimize hydrogenation of light olefins contained within such fractions.

$C_6$ and lighter hydrocarbons may be withdrawn from catalytic distillation reactor system 10 as side draw 24. Side draw 24 may include $C_6$ and lighter components, such as in the case of a total reflux, or may include a select portion of the $C_6$ and lighter components in the case of a partial reflux. In some embodiments, side draw 24 may include a $C_6$ fraction, including primarily $C_6$ components. In other embodiments, side draw 24 may additionally include $C_5$s, $C_4$s, and/or $C_3$s, depending upon the feed composition and the desired side draw composition.

Side draw 24 may then be fed to a second catalytic distillation reactor system 26 including at least one reaction zone 28 containing a hydrogenation catalyst. The side draw 24 may be introduced to catalytic distillation reactor system 26 above the catalyst bed 28, and hydrogen 30 may be fed to catalytic distillation reactor system 26 at a location below reaction zone 28, such that $C_6$ and lighter components, including benzene, may distill downward into the reaction zone and hydrogen may distill upward countercurrent to the benzene flow. Conditions for hydrogenation in catalytic distillation reactor system 26 are similar to those in catalytic distillation reactor system 10.

Following hydrogenation of at least a portion of the benzene, a light reformate fraction having a reduced benzene concentration may be recovered from catalytic distillation reactor system 26 as a second bottoms fraction via flow line 32.

Unreacted hydrogen may be recovered from catalytic distillation reactor system 26 as a second overheads fraction via flow line 34. In some embodiments, hydrogen in overheads fraction 34, being at a higher pressure, may be fed to catalytic distillation reactor 10 via flow line 6, and may be combined with recycle hydrogen recovered in line 20 and pressurized via compressor 36. Fresh hydrogen may also be supplied to catalytic distillation column 10 via flow line 38, for example. In this manner, hydrogen may be efficiently used and recycled within the system with minimal compressor duty.

Additionally, recycle of overheads fraction 34 may allow for use of a single overhead condenser system, reducing capital and operating costs associated with the increased piece count.

Figure 2:
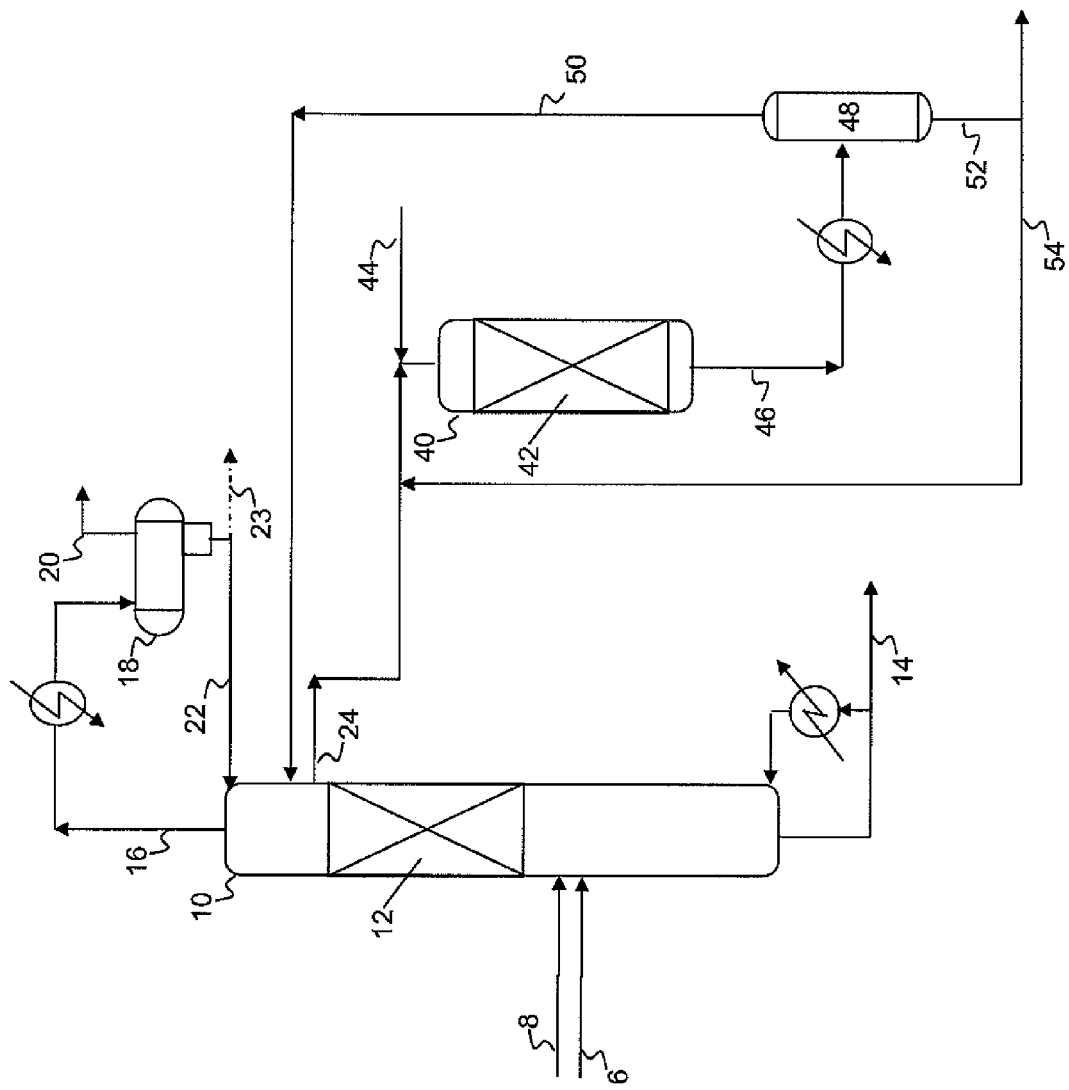
FIG. 2 is a simplified flow diagram of a process for the reduction or removal of benzene from hydrocarbon streams according to other embodiments disclosed herein.

Referring to FIG. 2, a simplified process flow diagram for the reduction or removal of benzene from hydrocarbon streams, according to embodiments disclosed herein, is illustrated, where like numerals represent like parts. In this embodiment, benzene-containing side draw 24 may be fed to a down-flow boiling point reactor 40 including at least one hydrogenation reaction zone 42 containing a hydrogenation catalyst. Hydrogen may be introduced to boiling point reactor 40 via flow line 44, and may flow co-current with the hydrocarbon fed via flow line 24.

Conditions for the hydrogenation of benzene to cyclohexane in downflow reactor 40 may include temperatures in the range from about 93° C. to about 288° C. (about 200° F. to about 550° F.) and pressures in the range from 11.4 to 42.4 bar (150 to 600 psig) in some embodiments. In other embodiments, temperatures may range from about 121° C. to about 160° C. (about 250° F. to about 320° F.), and pressures may range from about 14.8 to 18.3 bar (200 psig to about 250 psig). The benzene and the hydrogen may be contacted in the presence of the hydrogenation catalyst, converting at least a portion of the benzene to cyclohexane. The reactor effluent, recovered via flow line 46, may be cooled and separated via stripper or flash drum 48. Hydrogen and non-condensed lights may be returned to catalytic distillation reactor system 10 via flow line 50. The light reformate having a reduced benzene content may be recovered via flow line 52, a portion of which may be returned to reactor 40 to maintain sufficient catalyst wetting. As with the embodiment illustrated in FIG. 1, the embodiment illustrated in FIG. 2 may provide for use of a single overhead system for the recovery and recycle of lights and hydrogen.

Although embodiments described above in relation to FIGS. 1 and 2 include fractionation and hydrogenation in an initial catalytic distillation reactor system, benefits of the separation of a benzene-containing fraction, such as a $C_6$ cut, may also be realized utilizing a traditional distillation column. Additionally, benzene hydrogenation as described with respect to FIGS. 1 and 2 is typically performed after passing the reformate feed through a guard bed to remove catalyst poisons and other components detrimental to catalyst performance. As this guard bed treats the entire reformate feed, the guard bed is typically very large. As will be described below, embodiments described herein may allow for a significant decrease in the size of the guard bed, where the guard bed need only remove catalyst poisons from a portion of the total reformate feed.

Figure 3:
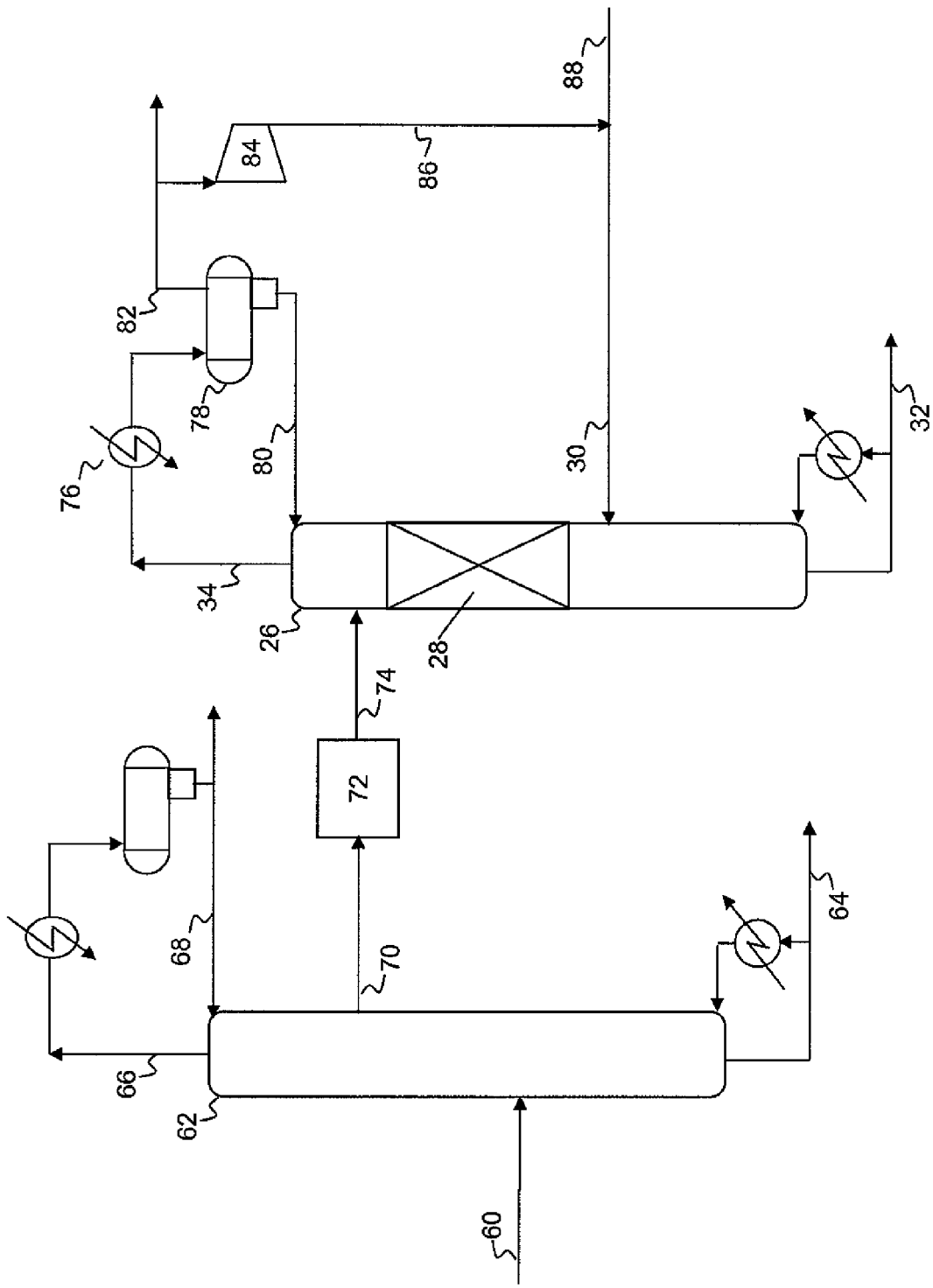
FIG. 3 is a simplified flow diagram of a process for the reduction or removal of benzene from hydrocarbon streams according to other embodiments disclosed herein.

Referring to FIG. 3, a simplified process flow diagram for the reduction or removal of benzene from hydrocarbon streams, according to embodiments disclosed herein, is illustrated, where like numerals represent like parts. A reformate stream 60, including benzene, components heavier than benzene, and components lighter than benzene, may be fed to a distillation column 62, including conventional distillation trays and/or structures. The operation of distillation column 62 may be such that components heavier than benzene distill downward within distillation column 62, separating the heavier components from $C_6$ and lighter components, including benzene. The $C_7$ and heavier components may be recovered from distillation column 62 as a bottoms fraction via flow line 64. Components lighter than benzene, such as a $C_4$ cut or a $C_5$ cut, may be recovered from distillation column 62 as an overheads fraction via flow line 66, at least a portion of which may be condensed and returned to distillation column 62 as reflux via flow line 68.

A fraction including benzene may be withdrawn as side draw 70 from a tray sufficiently above the feed tray, allowing for separation of the $C_7$ and heavier components from the $C_6$ fraction. The benzene in the $C_6$ fraction may then be passed through a guard bed 72 containing zeolites or other appropriate absorbents to remove acetylenes, dienes, and other components which may result in unwanted poisoning of the catalyst or formation of polymeric materials on the catalyst surface. In some embodiments, two or more guard beds may be placed in parallel, allowing for replacement or regeneration of one guard bed while continuing the benzene hydrogenation operation. Effluent from the guard bed may be recovered via flow line 74 and fed to a down-flow catalytic distillation reactor system 26 containing at least one hydrogenation reaction zone 28, as described above with respect to FIG. 1. In this embodiment, catalytic distillation reactor system 26 may include a stand-alone overhead system, where unreacted hydrogen and light components recovered in overhead fraction 34 may be cooled via heat exchanger 76, and the resulting liquid and vapor phases separated in drum 78. The column may be operated under total reflux, returning the entire portion of the condensate to catalytic distillation reactor system 26 via flow line 80. Hydrogen and any non-condensed lights may be recovered via flow line 82, a portion of which may be compressed via compressor 84 and recycled to column 26 via flow line 86 along with make-up hydrogen added via flow line 88.

Figure 4:
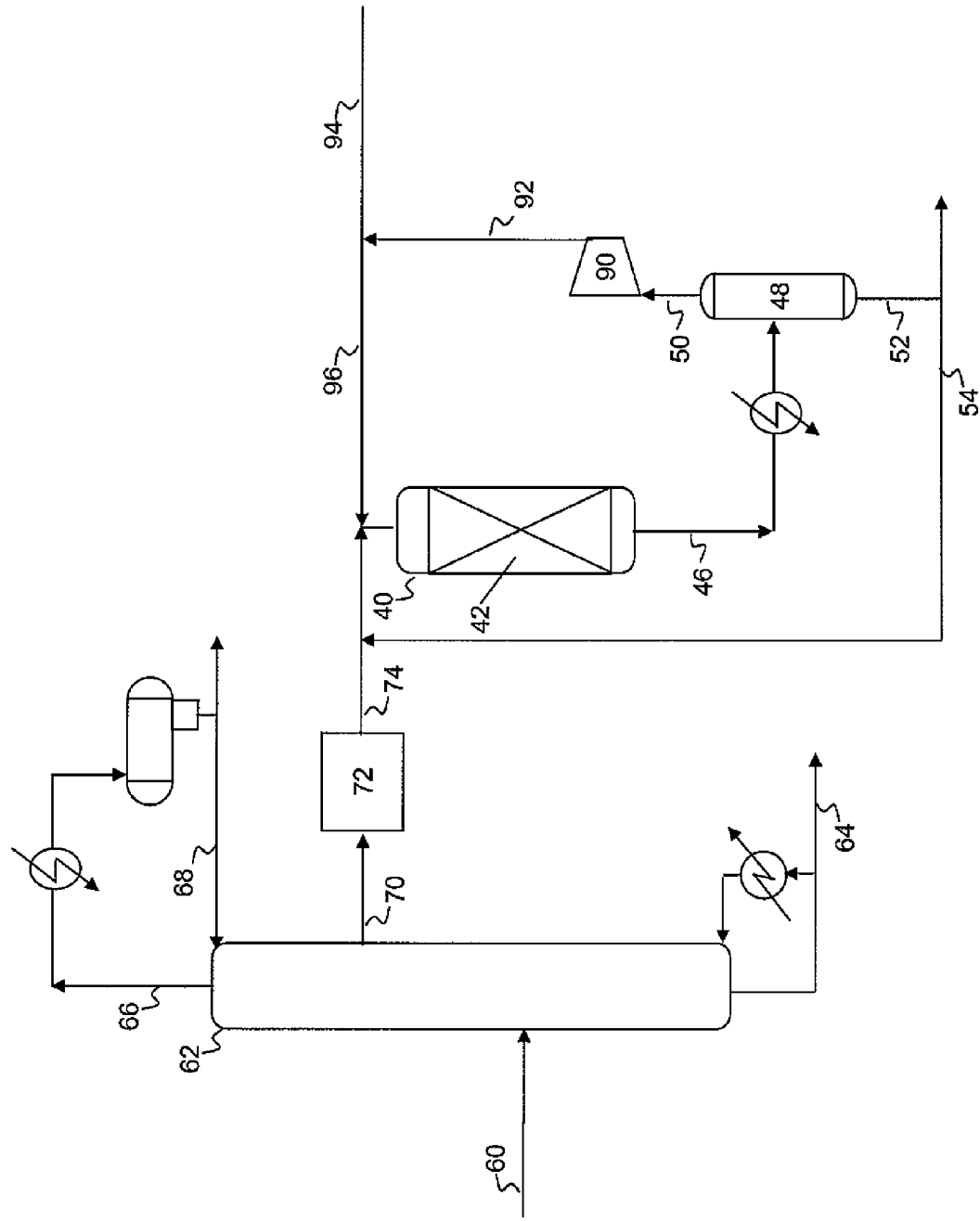
FIG. 4 is a simplified flow diagram of a process for the reduction or removal of benzene from hydrocarbon streams according to other embodiments disclosed herein.

Referring now to FIG. 4, a simplified process flow diagram for the reduction or removal of benzene from hydrocarbon streams, according to embodiments disclosed herein, is illustrated, where like numerals represent like parts. Following separation via traditional distillation, the benzene-containing side draw 70 may be passed through guard bed 72 to remove components detrimental to hydrogenation catalyst performance. Benzene in guard bed effluent 74 may then be hydrogenated in a down-flow boiling point reactor, similar to that described above with respect to FIG. 2. In this embodiment, vapor recovered from separator or stripper 48 via flow line 50 may be compressed via compressor 90, where compressed hydrogen in line 92 may be combined with make-up hydrogen 94 and recycled to the top of reactor 40 via flow line 96

As mentioned above, reformate streams may be separated into a fraction including primarily $C_6$ hydrocarbons, or may be separated into fractions including additional light hydrocarbons, such as a $C_5$-$C_6$ cut or a $C_4$-$C_6$ cut. In some embodiments, these fractions may be removed as a side draw, as described above. In other embodiments, various fractions, such as a $C_4$-$C_6$ cut, may be taken as a full overheads in the initial fractional distillation, where the entire overheads is then fed to a hydrogenation reactor for hydrogenation of the benzene.

Figure 5B:
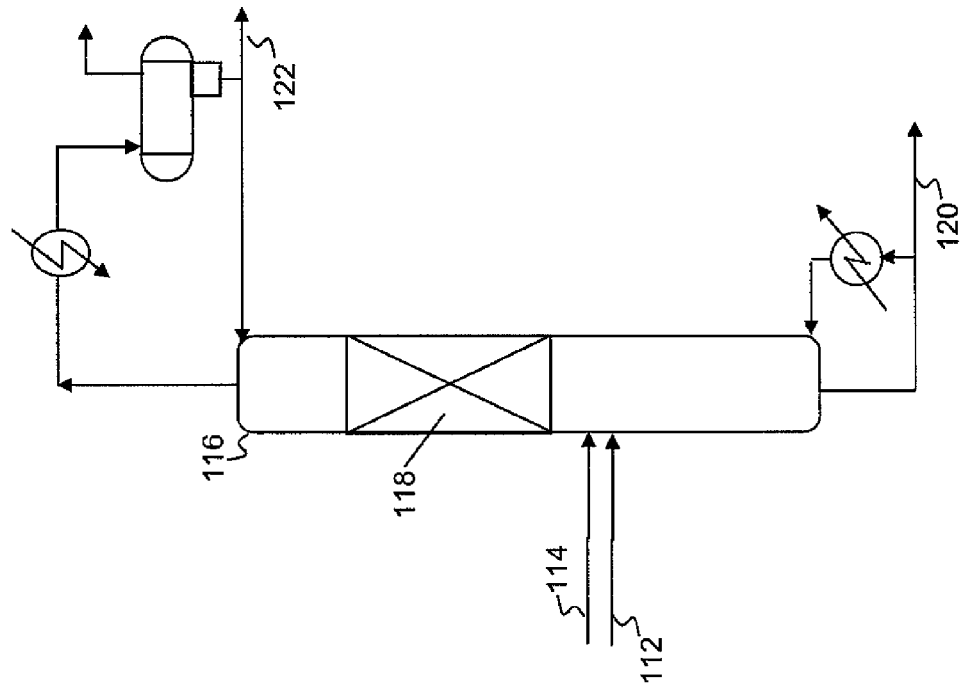
FIGS. 5a and 5b are simplified flow diagrams of a process for the reduction or removal of benzene from hydrocarbon streams according to other embodiments disclosed herein.
Figure 5A:
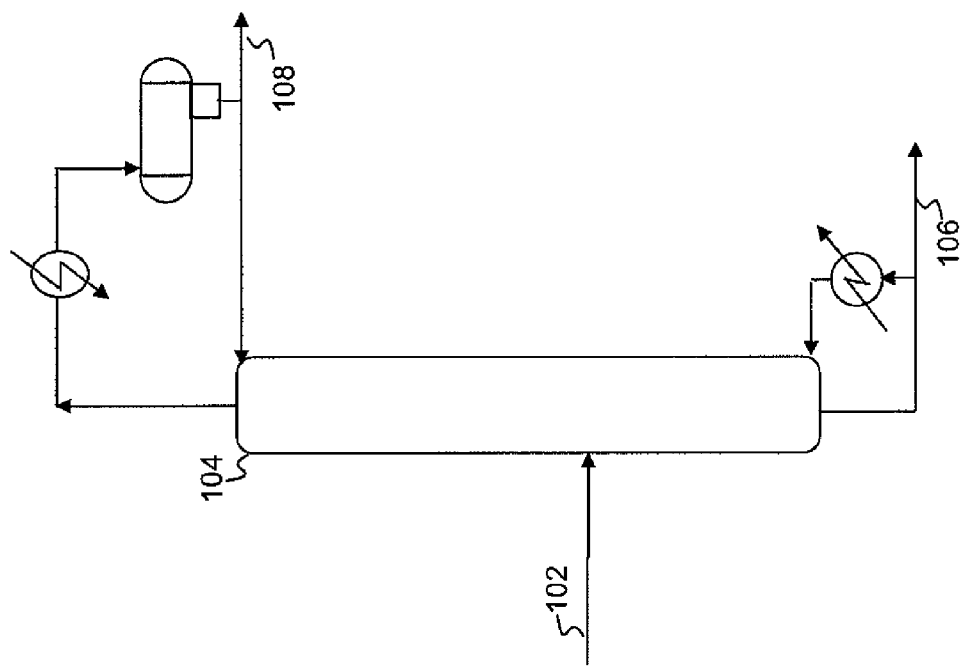

For example, as illustrated in FIGS. 5a, a full range reformate 102 may be fed to a distillation column 104. The full range reformats may then be fractionated into a lights fraction, including $C_6$ and lighter components, and a heavies fraction, including $C_7$ and heavier components. The heavies fraction may be recovered as a bottoms fraction 106, and the lights fraction, including benzene, may be recovered as an overheads fraction 108. The overheads fraction may then be fed to a down-flow catalytic distillation reactor system, a down-flow boiling point reactor, or other fixed bed reactors as described above for hydrogenation of the benzene to cyclohexane.

As another example, as illustrated in FIG. 5b, hydrogen 112 and a full range reformate 114 may be fed to a catalytic distillation reactor system 116, including at least one reaction zone 118 containing a hydrogenation catalyst. The hydrogen 112 and full range reformate may be fed to the catalytic distillation reactor system 116 at a location below the at least one reaction zone 118, such that $C_7$ and heavier components may distill downward, avoiding any undesired hydrogenation of toluene and other aromatic compounds. The $C_6$ and lighter hydrocarbons, including benzene, may distill upward, and contact of benzene and hydrogen in the presence of the hydrogenation catalyst may convert at least a portion of the benzene to cyclohexane. The heavies fraction, including the $C_7$ and heavier hydrocarbons, may be recovered as a bottoms fraction 120. The lights fraction, including $C_6$ and lighter hydrocarbons, may be recovered from the catalytic distillation reactor system 116 as an overheads fraction 122, which may then be fed to a down-flow catalytic distillation reactor system, a down-flow boiling point reactor, or other fixed bed reactors as described above for further hydrogenation of the benzene to cyclohexane.

Selective hydrogenation of benzene according to embodiments disclosed herein, such as by processes according to FIGS. 1-5, may effectively reduce or eliminate benzene in the light reformate fraction recovered via flow lines 32, 52. In some embodiments, the recovered light reformate fraction may contain 250 ppm or less benzene, by weight; 200 ppm or less in other embodiments; 150 ppm or less in other embodiments; 100 ppm or less in other embodiments, and 50 ppm or less benzene in yet other embodiments, by weight. In other embodiments, the benzene content of the recovered light reformate fraction may be 25 ppm or less; 20 ppm or less in other embodiments; 15 ppm or less in other embodiments; 10 ppm or less in other embodiments; 5 ppm or less in other embodiments; 2 ppm or less in other embodiments; 1 ppm or less in other embodiments; and 0.5 ppm or less in yet other embodiments, where each of the above weight fractions is on a weight basis. In other embodiments, benzene may not be present in the recovered light reformate fraction at detectable limits.

As described above, the reaction systems described herein may have separate or integrated overhead systems for the distillation columns, catalytic distillation reactor systems, and splitters. Integration may result in fewer overall pieces of equipment, thus reducing capital costs. In various embodiments, it may be preferable to run either integrated or non-integrated based on the capital costs, operating costs, and the separations achievable based on the operating pressure limitations of the integrated overhead systems.

In various embodiments, separation or integration of the reactors and distillation columns may provide the ability to run the down-flow catalytic distillation reactor system, the down-flow boiling point reactor, or other fixed bed reactor systems for hydrogenating benzene in the mid-range fraction ($C_6$ concentrate) at higher pressures. The ability to run at higher pressures may allow for a substantial reduction in the amount of catalyst required for the conversion of benzene to cyclohexane.

In embodiments where the benzene concentrate fraction recovered from the initial fractionation, either catalytic or traditional distillation, includes $C_5$ hydrocarbons and/or $C_4$ hydrocarbons, it has been found that activity of some hydrogenation catalysts may be enhanced over that expected for typical benzene hydrogenation in a $C_6$ concentrate. In these embodiments, a higher benzene throughput may be used while achieving greater than 99 percent conversion of the benzene. Such throughputs and conversions may also be achieved using less than 10 percent molar excess of hydrogen in various embodiments. A product containing less than 0.1 weight percent benzene may be recovered, and in some embodiments this level of benzene may be achieved with minimal reboiler duty and without using a hydrogen recycle compressor. Additionally, with the presence of $C_4$ and/or $C_5$ hydrocarbons, the reaction temperature used may be lower than for up-flow benzene conversion, as described with respect to column 10 in FIG. 1. As a specific example, catalyst productivity at 14.8 bar (200 psig) in a down-flow catalytic distillation reactor system, such as column 26 in FIG. 1, may be near 0.45 kg/h benzene converted per kilogram of dispersed nickel catalyst (about 1 lb/h benzene converted per pound of dispersed nickel catalyst).

EXAMPLE

The following examples are derived from modeling techniques. Although the work has been performed, the Inventors do not present these examples in the past tense to comply with applicable rules.

A process similar to that as illustrated in FIG. 1 is simulated, and stream reference numbers in this example refer to those as given in FIG. 1. A reformate feed stream 8 containing a range of hydrocarbons (C1 to C12) is fed to a catalytic distillation column 10, below a bed of hydrogenation catalyst 12. Toluene, other C7's, and heavier components (C8-C12) distill downward and are recovered in bottoms fraction 14. Benzene and other light hydrocarbons distill upward in the column, where the benzene contacts the hydrogenation catalyst and is at least partially hydrogenated. Unreacted hydrogen and other light components are recovered as an overheads fraction 16, a portion of which is condensed, and the column is operated under a total liquid reflux. A benzene-containing fraction 24 is withdrawn from column 10 as a side draw, and forwarded to downflow column 26, for further hydrogenation of the benzene. A hydrocarbon fraction having a reduced benzene content is recovered from column 26 as a bottoms fraction 32. The flow rates, compositions, and other characteristics of various flow streams is given in Table 1.

As can be seen in Table 1, approximately half of the benzene is hydrogenated in column 10, with the remaining benzene hydrogenated in column 26, resulting in a recovered light hydrocarbon fraction containing 0.01 weight percent (100 ppm) benzene and a recovered heavy hydrocarbon fraction containing 0.1 weight percent (1000 ppm) benzene. Overall conversion of benzene (total process) was approximately 98%, and conversion in the downflow column was approximately 99.9%.

TABLE 1

|  | STREAM ID | | | | | | |
| --- | --- | --- | --- | --- | --- | --- | --- |
|  | 8 | 30 | 14 | 24 | 32 | 38 | 6 |
| TOTAL RATE, LB/HR | 74376.71 | 526.828 | 54758.02 | 26398.38 | 15300.2 | 1456.512 | 27818.72 |
| TEMPERATURE, F. | 358.4286 | 100 | 420.8606 | 234.0121 | 359.4333 | 100 | 174.144 |
| PRESSURE, PSIG | 150 | 300 | 99.8 | 95.2 | 221.4 | 220 | 150 |
| MOLECULAR WEIGHT | 96.75 | 6.5854 | 106.7777 | 79.8994 | 83.1155 | 6.5854 | 29.4321 |
| TOTAL RATE, KG/HR | 33737 | 239 | 24838 | 11974 | 6940 | 661 | 12618 |
| TEMPERATURE, C. | 181 | 38 | 216 | 112 | 182 | 38 | 79 |
| PRESSURE, BARG | 10.34 | 20.69 | 6.88 | 6.57 | 15.27 | 15.17 | 10.34 |
| MOLECULAR WEIGHT | 96.75 | 6.5854 | 106.7777 | 79.8994 | 83.1155 | 6.5854 | 29.4321 |
| WT % | | | | | | | |
| HYDROGEN | 0.00 | 24.80 | 0.00 | 0.01 | 0.00 | 24.80 | 3.19 |
| C1-C3 | 0.32 | 74.16 | 0.00 | 0.41 | 0.42 | 74.16 | 19.40 |
| C4's | 2.87 | 0.96 | 0.00 | 2.66 | 0.19 | 0.96 | 20.32 |
| C5's | 6.14 | 0.09 | 0.00 | 27.08 | 16.22 | 0.09 | 34.27 |
| BENZENE | 5.01 | 0.00 | 0.10 | 6.53 | 0.01 | 0.00 | 1.84 |
| CYCLOHEXANE | 0.04 | 0.00 | 0.23 | 12.59 | 24.96 | 0.00 | 3.24 |
| C6's (OTHER) | 11.54 | 0.00 | 0.05 | 48.15 | 54.65 | 0.00 | 17.25 |
| TOLUENE | 18.42 | 0.00 | 24.89 | 0.01 | 0.01 | 0.00 | 0.00 |
| C7's (OTHER) | 9.92 | 0.00 | 12.63 | 2.56 | 3.55 | 0.00 | 0.48 |
| C8-C12 | 45.73 | 0.00 | 62.11 | 0.00 | 0.00 | 40.00 | 0.00 |
| TOTAL | 100.00 | 100.00 | 100.00 | 100.00 | 100.00 | 100.00 | 100.00 |
| KG/H | | | | | | | |
| HYDROGEN | 0.0 | 59.3 | 0.0 | 0.7 | 0.0 | 163.8 | 402.3 |
| C1-C3 | 109.0 | 177.2 | 0.0 | 49.5 | 29.0 | 489.9 | 2448.6 |
| C4's | 968.5 | 2.3 | 0.0 | 318.1 | 12.9 | 6.3 | 2563.5 |
| C5's | 2072.2 | 0.2 | 0.0 | 3242.8 | 1125.5 | 0.6 | 4324.3 |
| BENZENE | 1689.8 | 0.0 | 23.7 | 782.2 | 0.5 | 0.0 | 232.0 |
| CYCLOHEXANE | 13.8 | 0.0 | 57.6 | 1508.1 | 1732.5 | 0.0 | 409.1 |
| C6's (OTHER) | 3893.1 | 0.0 | 11.5 | 5765.1 | 3792.9 | 0.0 | 2177.3 |
| TOLUENE | 6215.3 | 0.0 | 6181.8 | 0.7 | 0.6 | 0.0 | 0.1 |
| C7's (OTHER) | 3348.3 | 0.0 | 3136.6 | 306.8 | 246.2 | 0.0 | 61.1 |
| C8-C12 | 15426.5 | 0.0 | 15426.5 | 0.0 | 0.0 | 0.0 | 0.0 |
| TOTAL | 33737 | 239 | 24838 | 11974 | 6940 | 661 | 12618 |

As described above, embodiments described herein may provide for the separation and hydrogenation of benzene from a hydrocarbon stream. Advantageously, embodiments disclosed herein may provide for the efficient reduction of benzene in a reformate stream, such as to below 1000 ppm by weight. In some embodiments, the separation and hydrogenation of a select portion of a reformate stream may allow for efficient catalyst usage, allowing for a reduced amount of catalyst to be used per unit volume of total feed while achieving low benzene levels, such as less than 0.2 or 0.1 weight percent benzene. Likewise, separation and hydrogenation of a select portion of a reformate stream may allow for a reduced guard bed size due to the reduced volume of hydrocarbons being treated. Additionally, through separation of $C_7$ and other heavier aromatic compounds, hydrogenation of toluene, xylenes, cumene, and other heavier aromatic compounds may be minimized, thus preserving these high-octane value components for use in the gasoline pool.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for reducing the concentration of benzene in a hydrocarbon stream, the process comprising:
    feeding a reformate comprising benzene, components lighter than benzene, and components heavier than benzene to a first distillation column;
    fractionating the reformate to form a fraction comprising benzene and other $C_6$ hydrocarbons, and a heavies fraction comprising $C_{7+}$ hydrocarbons;
    recovering the heavies fraction from the first distillation column as a first bottoms fraction;
    withdrawing the fraction comprising benzene from the first distillation column;
    feeding the fraction comprising benzene and hydrogen to a hydrogenation reactor comprising at least one reaction zone comprising a hydrogenation catalyst;
    contacting the benzene and hydrogen in the presence of the hydrogenation catalyst to
    recovering a fraction having a reduced benzene concentration,
    wherein the reformate further comprises acetylenes, dienes, and other catalyst poisons, the process further comprising passing the fraction comprising benzene through a guard bed to remove at least a portion of dienes, acetylenes, and other catalyst poisons prior to the feeding to a hydrogenation reactor;

wherein the fractionating further comprises forming a fraction lighter than the benzene fraction and comprising at least one of C3, C4, and C5 hydrocarbons, the process further comprising:

recovering the fraction lighter than the benzene fraction as an overheads liquid fraction;

returning at least a portion of the overheads liquid fraction to the first distillation column as reflux; and further comprising returning the overheads liquid fraction to the first distillation column as a total reflux.

2. The process of claim 1, wherein the hydrogenation reactor comprises a catalytic distillation reactor system, the process comprising:

feeding the fraction comprising benzene to the catalytic distillation reactor system to a location above the at least one reaction zone;

feeding the hydrogen to the catalytic distillation reactor system to a location below the at least one reaction zone;

recovering a fraction comprising unreacted hydrogen from the catalytic distillation reactor system as a first overheads vapor fraction.

3. The process of claim 2, further comprising feeding the first overheads vapor fraction to the first distillation column.

4. The process of claim 1, wherein the hydrogenation reactor comprises a down-flow boiling point reactor, the process comprising:

feeding the hydrogen and the fraction comprising benzene to a top of the down-flow boiling point reactor;

recovering an effluent comprising unreacted hydrogen and a hydrocarbon fraction having a reduced benzene content from the down-flow boiling point reactor;

separating a fraction comprising unreacted hydrogen from the hydrocarbon fraction having a reduced benzene concentration.

5. The process of claim 4, further comprising recycling at least a portion of the recovered hydrocarbon fraction having a reduced benzene concentration to the top of the down-flow boiling point reactor.

6. The process of claim 4, further comprising:

recovering the vapor fraction comprising unreacted hydrogen; and feeding the recovered vapor fraction comprising unreacted hydrogen to the first distillation column.

7. The process of claim 1, wherein the fraction comprising benzene further comprises at least one of $C_5$ and $C_4$ hydrocarbons.

8. The process of claim 7, wherein the fraction comprising benzene is withdrawn from the first distillation column as an overheads fraction.

9. The process of claim 1, wherein the fraction lighter than the benzene fraction is essentially free of benzene.

10. The process of claim 1, wherein the fraction comprising benzene is withdrawn from the first distillation column as a side draw.

11. A process for reducing the concentration of benzene in a hydrocarbon stream, the process comprising:

feeding hydrogen and a reformate comprising benzene, components lighter than benzene, and components heavier than benzene to a first catalytic distillation reactor system comprising at least one first reaction zone comprising a hydrogenation catalyst;

concurrently in the first catalytic distillation reactor system:

contacting the benzene and hydrogen in the first reaction zone to convert at least a portion of the benzene to cyclohexane; and fractionating the reformate to form a fraction comprising unreacted benzene and other $C_6$ hydrocarbons, and a heavies fraction comprising $C_{7+}$ hydrocarbons;

recovering unreacted hydrogen and light hydrocarbons comprising at least one of C3, C4, and C5 hydrocarbons as an overheads fraction from the first catalytic distillation reactor system;

condensing and separating the light hydrocarbons from the unreacted hydrogen;

recovering the unreacted hydrogen; and returning the condensed light hydrocarbons to the first catalytic distillation reactor system as a total reflux;

recovering the heavies fraction from the first catalytic distillation reactor system as a first bottoms fraction;

withdrawing the fraction comprising unreacted benzene and other $C_6$ hydrocarbons from the catalytic distillation reactor system as a side draw;

feeding hydrogen and the fraction comprising benzene and other $C_6$ hydrocarbons to a hydrogenation reactor comprising at least one second reaction zone comprising a hydrogenation catalyst;

contacting the benzene and hydrogen in the second reaction zone to convert at least a portion of the benzene to cyclohexane; and recovering a hydrocarbon fraction having a reduced benzene concentration.

12. The process of claim 11, wherein the fraction comprising benzene further comprises $C_5$ and lighter hydrocarbons.

13. The process of claim 12, wherein the reformate and the hydrogen are fed to a location below the at least one first reaction zone.

14. The process of claim 12, wherein the reformate further comprises acetylenes, dienes, and other catalyst poisons, the process further comprising passing the fraction comprising benzene through a guard bed to remove at least a portion of dienes, acetylenes, and other catalyst poisons prior to the feeding the fraction comprising benzene to a hydrogenation reactor.

15. The process of claim 12, wherein the hydrogenation reactor comprises a second catalytic distillation reactor system, the process comprising:

feeding the fraction comprising benzene and other $C_6$ hydrocarbons to the second catalytic distillation reactor system to a location above the at least one reaction zone;

feeding the hydrogen to the second catalytic distillation reactor system to a location below the at least one reaction zone;

recovering unreacted hydrogen from the second catalytic distillation reactor system as a second overheads vapor fraction.

16. The process of claim 15, further comprising feeding the second overheads vapor fraction to the first catalytic distillation reactor system.

17. The process of claim 12, wherein the hydrogenation reactor comprises a down-flow boiling point reactor, the process comprising:

feeding the hydrogen and the fraction comprising benzene and other $C_6$ hydrocarbons to a top of the down-flow boiling point reactor;

recovering an effluent comprising unreacted hydrogen and a hydrocarbon fraction having a reduced benzene content from the down-flow boiling point reactor;

separating a fraction comprising the unreacted hydrogen from the fraction having a reduced benzene concentration.

18. The process of claim 17, further comprising recycling at least a portion of the recovered fraction having a reduced benzene concentration to the top of the down-flow boiling point reactor.

19. The process of claim 17, further comprising:
recovering the fraction comprising unreacted hydrogen; and
feeding the recovered fraction comprising unreacted hydrogen to the first catalytic distillation reactor system.

* * * * *